(12) United States Patent  (10) Patent No.: US 9,280,512 B2
Benraz  (45) Date of Patent: Mar. 8, 2016

(54) COMPUTERIZED SYSTEM AND METHOD FOR REMOTE ACCESS TO A COMPUTER PROGRAM

(76) Inventor: Yosef Benraz, Herzelia (IL)

( * ) Notice: Subject to any disclaimer, the term of this patent is extended or adjusted under 35 U.S.C. 154(b) by 302 days.

(21) Appl. No.: 14/119,890

(22) PCT Filed: May 23, 2012

(86) PCT No.: PCT/IL2012/050183
§ 371 (c)(1),
(2), (4) Date: Nov. 25, 2013

(87) PCT Pub. No.: WO2012/160561
PCT Pub. Date: Nov. 29, 2012

(65) Prior Publication Data
US 2014/0089464 A1   Mar. 27, 2014

Related U.S. Application Data

(60) Provisional application No. 61/488,825, filed on May 23, 2011, provisional application No. 61/504,319, filed on Jul. 5, 2011.

(51) Int. Cl.
G06F 15/16 (2006.01)
G06F 15/173 (2006.01)
H04L 29/08 (2006.01)
G06Q 30/02 (2012.01)

(52) U.S. Cl.
CPC ...... *G06F 15/17306* (2013.01); *G06Q 30/0251* (2013.01); *H04L 67/025* (2013.01)

(58) Field of Classification Search
CPC .................................................. H04L 67/025

USPC ................................................. 709/217, 219
See application file for complete search history.

(56) References Cited

U.S. PATENT DOCUMENTS

| | | |
|---|---|---|
| 2007/0207773 A1 | 9/2007 | Braunstein |
| 2007/0288599 A1 | 12/2007 | Saul et al. |
| 2009/0235177 A1 | 9/2009 | Saul et al. |
| 2009/0300510 A1 | 12/2009 | Gantman et al. |

FOREIGN PATENT DOCUMENTS

WO   WO 2011/073973   6/2011

OTHER PUBLICATIONS

Oracle Corporation: Programming Interfaces Guide 2010 (retrieved on Sep. 24, 2012). Retrieved from the internet<URS: http://docs.oracle.com/cd/E19683-01/816-5042/index.html>.
International Search Report of Application No. PCT/IL2012/050183 mailed on Oct. 2, 2012.

*Primary Examiner* — Glenford Madamba
(74) *Attorney, Agent, or Firm* — The Law Office of Joseph L. Felber

(57) ABSTRACT

A computerized system for remote access to a computer program, the system comprising a computerized segmenting tool to create a segmented representation of a computer program by creating virtual objects that correspond to objects of the program and clustering the virtual objects to segments of the segmented representation and a remote access application to receive information about the segmented representation from the segmenting tool and to display the segments of the segmented representation, wherein each segment is controllable separately.

26 Claims, 3 Drawing Sheets

COMPUTERIZED SYSTEM AND METHOD FOR REMOTE ACCESS TO A COMPUTER PROGRAM

CROSS-REFERENCE TO RELATED APPLICATIONS

This application is a National Phase Application of PCT International Application No. PCT/IL2012/050183, International Filing Date May 23, 2012, entitled "Computerized System and Method for Remote Access to a Computer Program", published on Nov. 29, 2012 as International Patent Application Publication Number WO 2012/160561 claiming priority of U.S. Provisional Patent Application No. 61/488,825, filed May 23, 2011 and U.S. Provisional Patent Application No. 61/504,319 filed Jul. 5, 2011, each of which is incorporated herein by reference in its entirety.

BACKGROUND OF THE INVENTION

In many known computer remote controlling tools, a user receives into his work station a picture of the display of the remotely controlled computer. When the user performs operations in objects, the operation is transmitted to the remotely controlled computer and an updated picture or part of the picture is sent back to the user's work station, showing the display of the remotely controlled computer after the operation has been performed.

This process may be very slow and inefficient, and may cause many delays and obstacles to fluent work. Therefore, users may refrain from performing major tasks on a remote computer.

Additionally, the known remote controlling tools do not enable adaptations, modifications and/or updates of the display and of objects in the display of the remotely controlled computer in the user's work station.

The known remote controlling tools do not enable targeted advertisements on the display according to the display content of the running program in the remotely controlled computer in the user's work station.

Therefore, a remote access tool is needed which may enable efficient and fast remote controlling of a computer and adaptations of the display of the remotely controlled computer in the user's work station.

Additionally, when a user accesses the remote computer from a relatively small device such as a mobile phone, smartphone, tablet computer, note-book computer, it may be desired to have a method for adapting the appearance of the remote-controlled application to the device's display. Additionally, it may be desired to control and/or limit access to the remote computer by producing a code adapted to the user's needs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
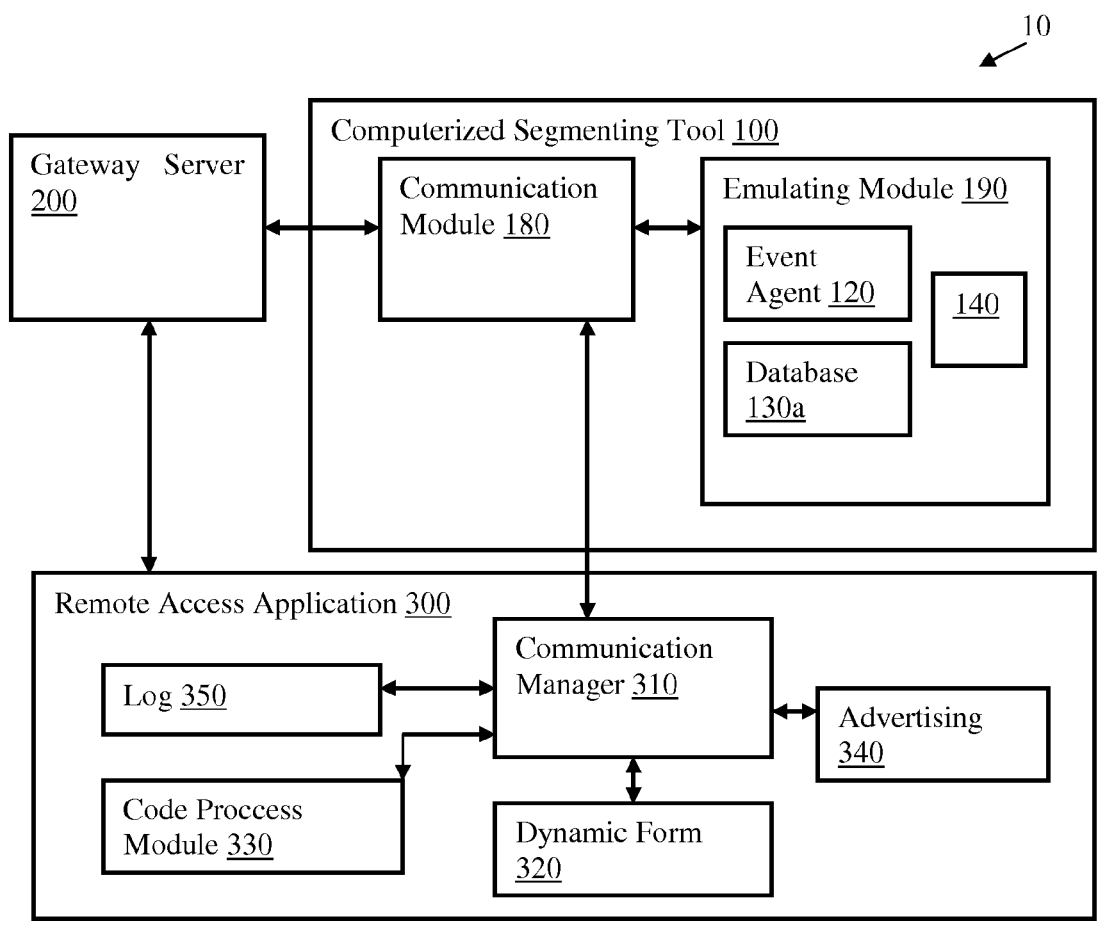
FIG. 1 is a schematic block illustration of a system for remote access to a computer program according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Embodiments of the present invention provides a method and system that facilitate remote access to a computer program and/or segments of a computer program together and/or separately, for example by clustering certain objects of the program together into segments that may be represented to a user separately on a display of a user's device. For example, the segments may be determined according to a display size and/or object size and/or other pre-define parameters. Additionally, each segment may be displayed and/or controlled separately by a user. Additionally, a method and system according to embodiments of the present invention may create a code or link that can be executed by the user's device, thus remotely accessing a computer program and/or segments of a computer program. The code or internet link may include, for example, a uniform resource locator (URL), a quick response (QR) code, a high capacity color barcode (HCCB), or any other code or link that may direct the user or enable access of the user to a remote computer program and/or segments of a remote computer program.

Remote access to a computer program according to embodiments of the present invention may be performed by creating a segmented representation of a computer program, for example create for the computer program a window form or a web page form segmented representation, which may replace, for example, the original display and/or interface of the computer program, and in which the computer program interface can be displayed according to user's preferences. The segmented representation may include object representatives, herein referred to as "virtual objects", wherein each virtual object may execute and/or reflect events correspondingly to events performed by/on a corresponding objects in the running program, herein referred to as "real objects", and vice versa. A computerized tool for virtual wrapping of a computer program and objects of a computer program is also described in the international application publication no. WO 2011/073973 of the same applicant as in the present application.

Reference is now made to FIG. 1, which is a schematic block illustration of a computerized system 10 for remote access to a computer program according to some embodiments of the present invention. Remote access system 10 may include a computerized program segmenting tool 100, a remote access application 300 and gateway server 200.

Remote access application 300 may be executed on a separate (for example, remote) work station than computerized program segmenting tool 100. Computerized segmenting tool 100 may create a segmented representation of a computer program and send information regarding the segmented representation to remote access application 300, which may build, run and/or display the segmented representation based on the received information. Additionally, segmenting tool 100 may cluster elements/objects of the computer program into segments and create a representation segments that represent the segments of the computer program. The created segmented representation may be displayed by remote access application 300 according to the segments, for example, by displaying and/or running the segments of the representation separately. Gateway server 200 may control data traffic between the work station on which segmenting tool 100 operates and the workstation on which remote access application 300 operates.

Additionally, gateway server 200 may include a database (not shown), which may be used for keeping data, for example, about relations and/or connections between servers and/or workstations, and/or data such as, for example, IP addresses that enables establishment of connections between servers and/or workstations. Gateway server may allocate suitable communication channels and serve as bridge and/or intermediate. Additionally, gateway server 200 may establish connections between servers and/or work stations and databases, for example a database that includes information about applications and/or users, such as application location, access limitations, logging data and/or any other suitable data according to some embodiments of the present invention. Gateway server 200 may process data received from segmenting tool 100 to remote access application 300, such as, for example, data to fit objects and/or segments to the device running remote access application 300, data to remove, rearrange or recreate objects an/or segments or other suitable data according to embodiments of the present invention.

According to embodiments of the present invention, as described herein, segmenting tool 100 may create a segmented representation by splitting computer program into few segments, the segments to be displayed separately, for example in several window and/or web pages. A user may change the segments and move and/or change the objects within the segments and/or between the segments. The size of the segments may correspond, for example, the size and/or shape of the display of the user's device. The user may browse between segments of the representation to see and use different portions and/or objects of the computer program.

Computerized program segmenting tool 100 may include emulating module 190 and communication module 180. Emulating module 190 may include event agent 120, form generator 140, database 130a and additional modules described in detail with reference to FIG. 2. Emulating module 190 may be able to create a segmented representation of a computer program by form generator 140, and may include event agent 120 to collect and pass data and/or commands from emulating module 190 via communication module 180 to remote access application 300 and vice versa. Emulating module 190 may identify a running program and analyze the objects within the running program. Then, emulating module 190 may create a segmented representation corresponding to the running program, which may be split to segments by form generator 140, as described in detail below with reference to FIG. 2. The segmented representation may include object representatives, herein referred to as "virtual objects",
wherein each virtual object may execute events correspondingly to events performed by/on a corresponding objects in the running program, herein referred to as "real objects". Emulating module 190 may cluster certain objects into segments. A group of segments may be created, that correspond to the original computer program. Communication module 180 may transfer to remote access application 300 the data and/or information needed to build, run and/or display a segmented representation, for example on a remote work station.

Form generator 140 may create the segmented representation by splitting the computer program to segments, i.e. cluster objects of the computer program to several segments of the representation, for example according to instructions and data received from event agent 120.

The virtual objects created by emulating module 190 may be graphic representatives, for example images, of corresponding real objects in the computer program. When displayed by remote access application 300, The virtual objects may be controlled and/or moved by a user separately. Additionally, a whole segment created by emulating module 190 that includes several objects may also be a graphic representative, for example, of a corresponding segment of the computer program, and in remote access application 300 each segment may be displayed, controlled and/or moved by a user as one piece.

Remote access application 300 may include a communication manager 310, a dynamic form module 320, a code process 330 an advertising module 340 and an activity log 350. Communication manager 310 may control the data transactions to and from communication module 180 and/or gateway server 200. Additionally it may manage other connections to databases internal or external to the remote work station. For example; Communication manager 310 may manage the connection with targeted advertisements databases and/or providers and/or activity logs.

The segmented representation may be displayed by remote access application 300 in a window form or a web page form, which may replace, for example, the original display and/or interface of the computer program, and in which the computer program interface can be displayed according to a user's preferences. For example, the objects in the segmented representation can be arranged differently than in the original form of the computer program, and/or only some of the objects can be presented. For example, any other parameter of the objects in the program interface, such as location, size or any other suitable parameter, can be changed in the segmented representation according to the user's preferences and/or implementation.

Remote access application 300 may be or include a web page or a window form located in a local machine, i.e. the same machine on which the original application is running, and/or other remote machine (server and/or work station) in a remote access application, and/or a web page within an existing web application and/or website (such as Facebook, Google+, LinkedIn or any other website). As described above, remote access application 300 may build and/or run and/or display a segmented representation according to information received from segmenting tool 100. The segmented representation may imitate, for example, the original display and/or interface of the computer program. In embodiments of the present invention, the segmented representation may include several segments of the original display and/or interface that may be displayed separately, for example in different pages and/or web-pages. For example, the size or amount of objects in each segment may correspond to the device parameters by which the segmented representation is displayed. For example, the size or amount of objects in each segment may correspond to the size and/or shape of the display by which the segmented representation is displayed. Accordingly, remote access application 300 may build and/or run and/or display a segmented representation in several pages, each page may include one or more segments, according to information received from segmenting tool 100. In some embodiments of the present invention, remote access application 300 may create and/or display a page, which may present a segment or group of segments, which may be currently active, i.e. used and/or operations may be performed in this segment in the original computer program. When other segment or segments become active, the display within the page may be replaced and/or updated to present the active segment and/or segments.

Additionally, parameters of the representation and/or segments of the representation may be set according to a user's preferences. For example, the objects in the segmented representation within remote access application 300 can be arranged differently then in the original form of the computer program, and/or only some of the objects can be presented. In some embodiments of the present invention, certain objects and/or segments of the segmented representation may be inactivated. For example, in some embodiment of the present invention, certain objects may be ignored/blocked in segmenting tool 100, thus, for example, being excluded from the segmented representation. In other embodiments of the present invention, a user may enter a command to exclude from the segmented representation certain objects and/or segments of the segmented representation. Additionally, a user may enter a command to move objects between segments of the segmented representation.

In some embodiments of the present invention, the segmented representation may run on the same work station/server on which the computer program is running. The remote access application 300 may run in the same workstation/server in which the computer program and/or segmenting tool 100 run.

As described herein, remote access application 300 according to embodiments of the present invention may execute operations, for example, to traverse firewalls, enforce security policy, activate a workflow, and additional operations as described herein.

Remote access application 300 may be implemented as a web base application, window form and/or mobile devices oriented application. In some embodiments of the present invention, connection to the original work station/server from a remote computer may be done, for example, by web browsing, by connecting to the segmenting tool 100.

Computerized program segmenting tool 100 and remote access application 300 may each be, for example, a computer program which may be stored in a general purpose computer or in an apparatus which may be specially constructed for the desired purposes. As mentioned above, remote access application 300 may be executed on a different (for example, remote) work station/server than computerized program segmenting tool 100. Computerized program segmenting tool 100 and remote access application 300 may each be stored in a non-transitory computer readable storage medium, such as, but not limited to, any type of memory device, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing.

Computerized program segmenting tool 100 and remote access application 300 may each be implemented in many wireless, handheld and portable communication devices, such as, for example, wireless and cellular telephones, smart telephones, personal digital assistants (PDAs), tablet computers and any device that may provide wireless access to a network such, an intranet or the internet. It is appreciated that the present invention may be used in a variety of applications.

Additionally, during operation of the segmented representation, information regarding any event initially occurring in a virtual object of the segmented representation may be transmitted by communication module 180 to the corresponding real object in the running program, in order to perform the same event in the real object. Similarly, any event initially occurring in a real object of the running program may be transmitted by communication module 180 to the corresponding virtual object of the segmented representation, in order to perform the same event in the virtual object. Correspondence and/or relation data between real and virtual objects may be stored in data base(s) accessible by segmenting tool 100 and/or remote access application 300.

Additionally, during operation, information regarding any Mouse and/or Keyboard and/or Touch event initially occurring in the corresponding object representation may be transmitted by communication module 180 to the corresponding real object in the running program, in order to perform a suitable event in the real object.

The data and/or information needed in order to build/run the segmented representation and/or to coordinate events between real objects and virtual objects, for example as described above, may be received by dynamic form module 320 through communication manager 310. Dynamic form module 320 may create and/or run and/or display the segmented representation based on the received information, perform events at the virtual objects, and communicate information regarding events in the virtual objects to communication module 180 via communication manager 310. Creation of the segmented representation may include recreation of the segmented representation based on information received from communication module 180 and/or importing of elements of the segmented representation from segmenting tool 100 through communication module 180. The information received by dynamic form module 320 may include information required for creation of the virtual objects to be coordinated with the corresponding real objects of the running program.

Communication module 180 within segmenting tool 100 may be a virtual module, i.e. not necessarily implemented in a real system. The format of communication module 180 may depend on the limitations such as security and communication technology. In some embodiments of the present invention, for example, if remote access application 300 runs in the same system where segmenting tool 100 runs, the communication of segmenting tool 100 with dynamic form module 320 may be performed directly, for example without passing through communication module 180.

Dynamic form module 320 may dynamically and automatically create and/or display the segmented representation, for example, based upon data received from communication module 180 and based on the original form of the computer program running in the remote computer. The created segmented representation may include, for example, several segments that may be displayed separately in several pages or web pages. The original form of the computer program may be, for example, in a window form. Event agent 120 within segmenting tool 100 may control dynamic form module 320 via communication module 180, for example by sending instructions and data to dynamic form module 320, based on which dynamic form module 320 may create and display the remote segmented representations and/or segments of segmented representations.

According to embodiments of the present invention, remote application 300 may display a created segment of a segmented representation. User commands for a certain virtual object in the segment of the segmented representation may be inputted, for example, by keyboard, mouse, touch screen, voice and/or any other suitable manner in the device running the segmented representation. The user commands may be passed by event agent 120 to the corresponding real object in the original computer program, and vice versa. The virtual objects may be moved within and/or between segments of the segmented representation, for example by user commands, so that virtual objects are not located in the segmented representation in similar relative locations to the locations of the real objects in the original program. However, a virtual object in the segmented representation may be associated exclusively with a real object. Accordingly, agent 120 may route commands from virtual objects to the real objects independently of the locations of the virtual objects in the segments of the segmented representation.

In some embodiments of the present invention, remote application 300 may be a window or web application within a website and/or mobile oriented application (e.g. smart-phone native application). Dynamic form module 320 may be a module within or part of the window application and/or the web application within a web site and/or mobile oriented application. Dynamic form module 320 may create said segmented representation automatically by dynamically creating and/or displaying virtual objects, for example, within segments of the segmented representation as discussed herein the virtual objects may control real objects in the original program and/or may be controlled by the real objects by transmission of events to and from corresponding real objects in the original computer program via communication module 180 and communication module 310, which may pass the events to and from event agent 120, for example directly or via gateway server 200.

In some embodiments of the present invention, remote access application 300 may display a screen image of the original program, for example the entire screen of the workstation/server running the original program or only a specific computer program screen, for example in a similar manner as in known remote access desktop solutions such as, for example, LogMeIn, TeamViewr, Microsoft RDP, GoTo-MyPC. All mouse and keyboard actions may be routed between the work stations/servers. Additionally, according embodiments of the present invention, remote application 300 may display segments of a computer program, for example in order to fit size and/or shape of a device display. In such embodiments of the present invention, segments of the computer program may be controlled separately. In some embodiments, remote application 300 may pass commands from virtual objects to corresponding real objects that are displayed in a currently displayed segment of the segmented representation. Remote application 300 may block other commands, for example commands from real objects that correspond to virtual objects that are not currently displayed. Alternatively, remote application 300 may pass commands from real objects to corresponding virtual objects that are not currently displayed. For example, remote access application 300 may display a notification once a command is passed from an object not displayed, or automatically navigate or change the display to show the segment that includes the object that received the command.

In some embodiments of the present invention, remote access application 300 may create a main page, such as a virtual desktop in one or more pages/web-pages, which may display links and/or shortcuts to available original computer program and/or segmented representations of computer programs. By selecting a link and/or shortcut, a user may activate the corresponding computer program by connecting the server running the computer program directly or via gateway server 200. Additionally, a user may browse between pages and/or web-pages that display different segmented representations and/or different segments of segmented representations of corresponding different computer programs. Additionally, in some embodiments of the present invention, shortcuts and/or links to segmented representations may be clustered, sorted and/or arranged in albums of shortcuts and/or links, according to any desired parameters.

The virtual desktop and/or albums created by remote access application 300 may include different shortcuts/links to original computer program and/or segmented representations of computer programs, for example being run by different servers. Additionally, the virtual desktop and/or album may include shortcuts/links to segmented representations of desktops of different workstations that may run by different servers. The various virtual desktops and/or albums may be created automatically and/or arranges manually by a user.

A shortcut/link to segmented representation of a desktop or a computer program may include a code or internet link such as, for example, a uniform resource locator (URL), a quick response (QR) code, a high capacity color barcode (HCCB), or any other code or link that may direct the user or enable access of the user to a remote computer program and/or segments of a remote computer program. The shortcut/link may include encrypted information. The shortcut/link may direct to information located in a data base, for example via gateway 200, which may include, for example, location of a corresponding computer program, IP address of the server running the computer program, user name, password, expiry date, access limitations and/or any other information required for establishing connection with and/or running the computer program.

According to some embodiments of the present invention, remote access application 300 may be embedded in a website (for example, similarly to YouTube embedded player). Accordingly, a link embedded in a website may include some parameters which may enable connection to a corresponding computer program by a segmented representation. The parameters may include location of a corresponding computer program, IP address of the server running the computer program, user name, password, auto connect, information to display, screen size of the device on which the segmented representation should be run and/or display, and/or any other required information for establishing connection with and/or running the corresponding computer program.

In some embodiments of the present invention, dynamic form module 320 may dynamically create based on a window form segmented representation of the computer program, for example upon a request from segmenting tool 100, resource files which include mechanisms which can be loaded or/and run and/or executed by a web browser and/or web application and/or window and/or any application of any operating system installed in a device. The target form of the virtual form created by dynamic form module 320 may be, for example, in a window form. The mechanisms which may be included in the dynamically created resource files may be files and/or scripts which may include language and/or format and/or syntax and/or markup language and/or any other standard supported by common internet browsers and/or operating system oriented.

In this description, the term "resource file" refers to a resource file which may be stored in any computer readable storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing. Additionally, the content of the resource file may be encrypted or not and may include a specific implementation data format.

Dynamic form module 320 may present the generated segmented representation to the user, who may instruct to change the generated representation or to create another one. For example, according to embodiments of the present invention, the user may instruct to remove objects, change the segmentation of objects, move objects from segment to segment and/or change the order of segments and/or pages/web-pages. Any segmented representation and/or segments generated by Dynamic Form 320 may be stored in data base 130a, automatically or upon instructions received from the user via communication module 180. Additionally or alternatively, segmented representations and/or segments generated by dynamic form module 320 may be stored in a data base external to segmenting tool 100, such as locally in the work station running the original computer program and/or segmented representation, and/or within gateway server 200 and/or in other server connected to client work station via communication manager 310.

The virtual objects in the remote access application 300 may operate according to control messages provided by an operating system of the remote station in which remote access application 300 is operating. An event agent of segmenting tool 100 may receive via communication module 180 the control messages and transmit the control messages from the virtual objects to the corresponding real objects in the running program and vice versa, so that the virtual objects and the real objects may operate correspondingly according to the control messages, i.e. so that the virtual object may be up-to-date and fully represent the real object and display changes. Additionally, any data update of a virtual object may be transmitted via communication module 180 to the corresponding real object, which may be updated accordingly, and vice versa.

In some embodiments of the invention, remote access application 300 may create a virtual desktop, in which the virtual shortcuts of the computer programs may be presented. When a user clicks on a virtual shortcut, the operation of the respective computer program may be initiated on the computer on which it is installed and the segmented representation of the program may be presented in the remote access application 300 in the remote computer.

A virtual form created by dynamic form module 320 may be include the segmented representation for a computer program, an advertising portion to display targeted advertisements and banners, and logic plug-in portion for logical objects.

Advertising module 340 may connect to advertising provider's database to generate and display targeted advertisements according to the program for which the segmented representation form is created. Advertising module 340 may use well known methods similar to Google's AdSense/AdWords and/or any other suitable method and/or mechanism and/or concept. For example, advertising module 340 may track user actions and/or other information such as, for example, location, connections, internet protocol (IP) address and/or information about the computer program, such as, for example, version, assembly version, release date, author. Such actions and information may be tracked by, for example, activity log 350. Based on the tracked information, Advertising module 340 may display targeted advertisements.

Additionally, according to some embodiments of the present invention, segmenting tool 100 may generate a code or link such as a QR code, HCCB, URL or any other suitable type of code or link. Segmenting tool 100 may save the code at a database 130a and/or other external or internal database. Segmenting tool 100 may send the code or link to a user or several users via e-mail, SMS and/or by sharing the code/link via a web-page. Alternatively, the code may be scanned or captured by a camera in the device running remote access application 300. Communication manager 310 may receive the code or link from a user and send it to code process module 330. Code process module 330 may analyze the code and/or link. According to the analysis, code process module 330 may exchange additional data and/or instructions with gateway 200 via communication manager 310, such as the IP address of the workstation running the computer program, access limitations, expiry date and time of the code and any other required data. Based on the data, process module 330 may verify the validity of the code/link.

The code may be in any data format, image format (for example, a PNG, BMP, JPG file or another image format), raw data/dataset, instructions that represent the code, or any other format depending on the implementation. The code may include information such as, for example, URL, name/directory of application and any other additional parameters.

If the code valid, process module 330 may establish a connection with a certain segmented representation and/or segment as discussed above, by executing the code. In some embodiments, for example, the code is limited for a certain number of connections to the segmented representation and/or segment. Therefore, upon connection to the segmented representation, gateway server 200 may update a counter that a connection has been established, for example by receiving the connection information from process module 330 via communications module 310.

In some embodiments, the code/link may include a URL address, and by executing the code process module 330 may direct a user to the URL address and/or location in a web page of the segmented representation of the computer program, running by an internet browser.

Figure 2:
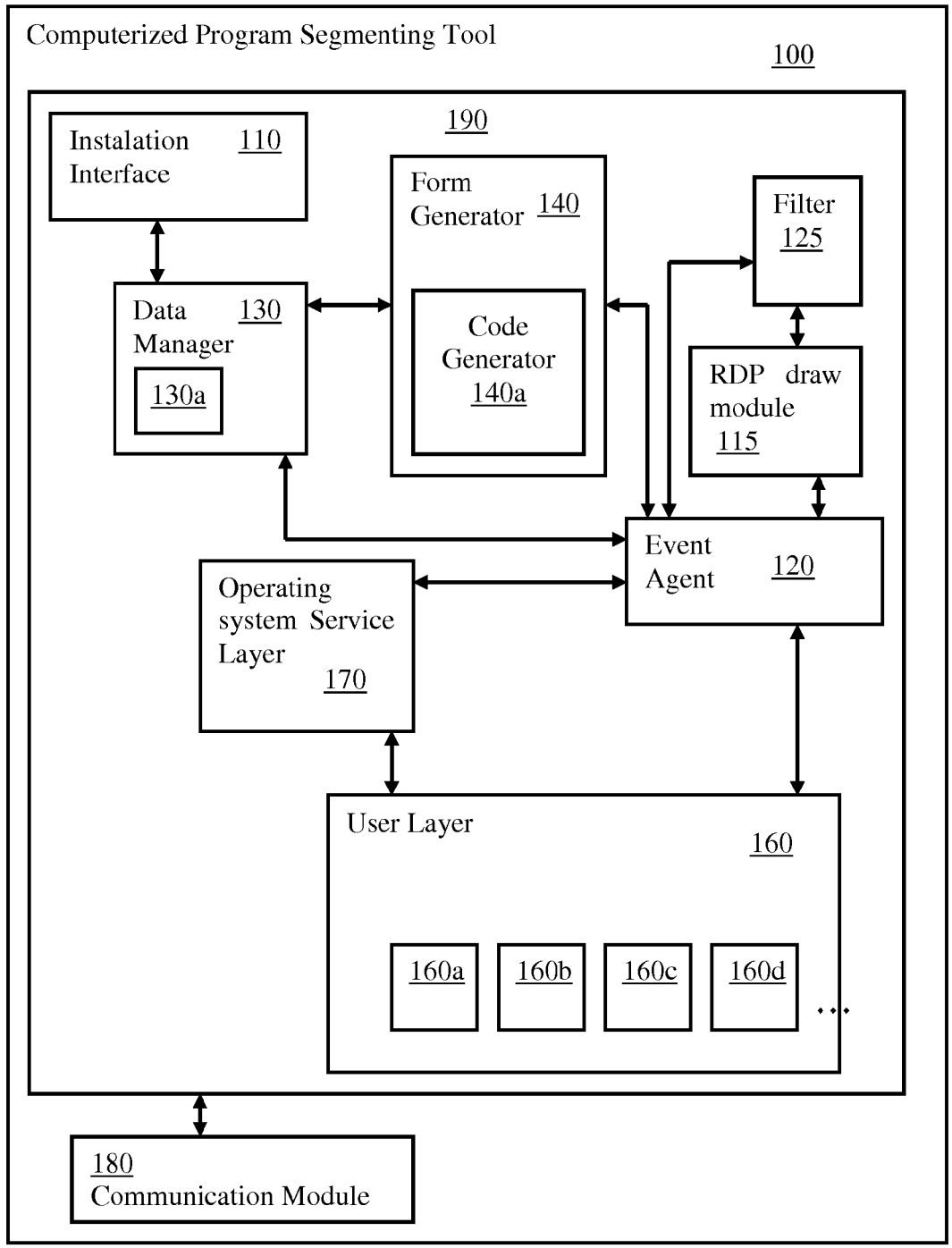
FIG. 2 is a schematic illustration of a computerized segmenting tool according to embodiments of the present invention.

Reference is now made to FIG. 2, which is a schematic illustration of a computerized segmenting tool 100 according to embodiments of the present invention. As mentioned above, segmenting tool 100 may split computer program into few segments. As described above, segmenting tool 100 may include emulating module 190 and communication module 180. Emulating module 190 may include, as discussed above, event agent 120 and database 130a.

Emulating module 190 may include an operating system service layer 170 which may control operation of computer programs and a user layer 160 in which a user may interface with computer programs. In user layer 160, a user may choose computer programs, for example, at least one of programs 160a, 160b, 160c and/or 160d, to be wrapped by segmenting tool 100.

Emulating module 190 may further include an installation interface 110, an event agent 120, a data manager 130 and a form generator 140. Data manager 130 may manage database 130a and may be adapted to search for data, extract data, store data and/or update data in database 130a. Database 130 may be internal or external to the workstation running segmenting tool 100. Additionally, emulating module 190 may include a filter 125 and a remote desktop protocol (RDP) draw module 115.

Installation interface 110 may enable a user to add data to database 130a, such as externally user-made segmented representations and/or segmented representations segments, for example designed by a user.

Event agent 120 may control data manager 130. For example, event agent 120 may request data manager 130 to search for data, extract data, store data and/or update data in data base 130a. Additionally, event agent 120 may control form generator 140, for example by sending instructions and data to form generator 140, based on which form generator 140 may create the segmented representations, i.e. cluster objects of the computer program to several segments of the segmented representation. The objects may be clustered, for example, according to screen size of the device running remote application 300, the desired page/form size and/or shape, and/or type, size and/or location of the object.

Agent 120 may pass user commands, operations and/or inputs such as, for example, mouse operations, keyboard operations, touch-screen operations, voice operations and/or any other type of operations and changes executed in virtual objects to corresponding real objects, and may pass such changes, commands, operations and/or inputs in real objects to corresponding virtual objects, for example unless blocked by filter 125 as described herein.

Filter 125 may identify changes in pixels, objects and/or data contents within segments of the segmented representation. Filter 125 may receive information, for example by event agent 120, about currently active segments in remote application 300. Filter 125 may pass changes in an active segment or segments of the original computer program and/or segmented representation to remote access application 300. Active segments may be segments which are currently displayed by a device of a user and/or used and/or controlled by a user. In some embodiments, changes in pixels, objects and/or data contents within inactive segments, i.e. segments which are currently not displayed by a device of a user and/or used and/or controlled by a user, may be blocked by filter 125, i.e. not be passed to remote access application 300. In some embodiments of the present invention, a notification about the changes in inactive segments may be sent to remote access application 300, which may display the notification to the user. In other embodiments, changes in inactive segments may be passed to remote access application 300. In such cases, for example, the display may automatically change to the relevant segment where the change occurred.

Event agent 120 may identify a program chosen by the user, for example, program 160a. Event agent 120 may request data manager 130 to search data base 130a for previously defined segmented representation(s) and/or segments of segmented representations for program 160a and/or wrapping and/or segmenting instructions relating to program 160a, for example, instructions how to split the computer program to segments in the segmented representation. In case previously defined segmented representation(s) and/or segments and/or wrapping and/or segmenting instructions relating to program 160a are stored in data base 130a, event agent 120 may request form generator 140 to create a segmented representation and/or segments based on previously defined instructions, and present the generated wrap to the user. In case more then one predefined segmented representation is stored in data base 130a for program 160a, event agent 120 may present the options to the user, who may choose a segmented representation from the predefined segmented representations or instruct to generate another segmented representation. The user may also choose one of the predefined segmented representations to be the default wrap to be used absent other instructions from the user.

RDP module 115 may draw and/or take snapshots of objects and/or segments according to instructions of event agent 120, the snapshots may be used for creation of segments of the segmented representation by form generator 140 and for identification of changes by filter 125. RDP draw module 115 may capture pixel/image/window changes, the captured changes may be sent to filter 125 which may pass the changes to remote application 300 or block the changes as described above. In addition, RDP module 115 may transmit graphics commands (GDI commands) to remote application 300 to be draw the changed object directly in the corresponding location within the corresponding segment.

In case data base 130a does not include previously defined wrapping and/or segmenting instructions relating to program 160a, form generator 140 may create, for example upon a request received from event agent 120, a suitable segmented representation, including segments of the segmented representation, for program 160a. For example, absent other instructions from the user, form generator 140 may automatically create a segmented representation and segments which may substantially correspond to the original form of computer program 160a, for example, in arrangement, according to, for example, predefined instructions and/or required and/or pre-defined size and/or shape of the segments, such as, for example, in accordance to a certain screen size and/or shape. Alternatively, form generator 140 may create the segmented representation based on the default instructions and/or instructions provided by the user in advance. The default and/or user instructions may be stored in data base 130a and extracted when needed by data manager 130. The default implementation may select objects from computer program according to size of objects, location and according to target device screen size and cluster them in segments to be display together and controlled separately from same page.

Form generator 140 may create segmented representation segments for a computer program, wherein the segments may include, for example, virtual objects as defined above. Segments and virtual objects may be created, for example, by using snapshots of objects and segments of the original computer program, for example taken by RDP draw module 115 as described above. Form generator 140 may create the segmented representation segments automatically, for example, upon a request from event agent 120, by dynamically creating, based on the original form of the computer program, resource files which include mechanisms which can be loaded or/and run and/or executed by a web browser or by an image displayed by remote access application 300. The original form of the computer program may be, for example, in a window form. The mechanisms which may be included in the dynamically created resource files may be files and/or scripts which may include language and/or format and/or syntax and/or markup language and/or any other standard supported by common internet browsers. In some embodiments, a data set and/or a specific purpose protocol supported by remote application 300 and/or gateway server 200 may be used. In this description, the term "resource file" refers to a resource file which may be stored in any computer readable storage medium, such as, but not limited to, any type of disk, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EE- PROM's), FLASH memory, magnetic or optical cards, or any other type of media suitable for storing.

Event agent 120 may present the generated segmented representation segments to the user, who may instruct to change the generated segments or to create other segments, for example, by rearranging objects within the segments and/or moving objects between segments. Any segmented representation segment or group of segments generated by form generator 140 may be stored in data base 130*a*, automatically or upon instructions received from the user.

As mentioned above, form generator 140 may exclude objects from the segmented representation, i.e. not including the excluded objects in any of the segments of the segmented representation. The exclusion may be, for example, according to instructions received from a user and/or stored in database 130*a*. Instead of an excluded object, the relevant segment of the segmented representation created by form generator 140 may display a corresponding portion of a background image so that, for example, the excluded object may not be viewed in the relevant segment. Alternatively, the segmented representation segment may display the excluded object, for example, by displaying a snapshot of the object as mentioned above, and mark it as inactive. Operations performed by a user on the excluded objects may be ignored and not passed to event agent 120.

Additionally, form generator 140 may change other parameters such as size, font, language of the segments and/or objects based on instructions received from a user and/or stored in database 130*a*, and/or based on device parameters running remote application 300, such as, for example, operating system, display size and/or any other suitable parameter.

Form generator 140 may include a code generator 140*a*. Code generator 140*a* may create a code or link based on instructions and data received from event agent 120. Event agent 120 may generate a dataset for the generated code that may include expiry date, access limitations, access counter, and any additional suitable information. The dataset may be saved in database 130*a* via database 130 or in external database vie gateway server 200. The dataset may be compressed into the generated code, for example together with an address or location of the dataset in the database. In some embodiments, a URL or link that includes the location of the dataset and may be compressed into the generated code/link by code generator 140. In some embodiments, the generated code/link may be a code or internet link such as, for example, a uniform resource locator (URL), a quick response (QR) code, a high capacity color barcode (HCCB), or any other code or link that may direct the user or enable access of the user to a remote computer program and/or segmented representation of a remote computer program, for example by remote access application 300, as discussed above with reference to FIG. 1, or via another remote access provider. The generated code/link may be sent to a user or several users via e-mail, SMS and/or by sharing the code/link via a web-page. The dataset included in the code/link may also include a maximum number of shares permitted for the specific code/link, and/or maximum number of connections with a original computer program and/or segmented representation enabled by the specific code/link. Counters that may count number of shares and/or number of connections may be stored within the dataset and invalidate the code/link ones the maximum number of shares and/or connections are performed. As discussed above with reference to FIG. 1, the shortcut/link may include encrypted information. The shortcut/link may direct to information located in a database, for example via gateway 200, which may include, for example, location of a corresponding computer program, IP address of the server running the computer program, user name, password, license number, limitation on count of simultaneous access to a computer program and/or any other information required for establishing connection with and/or running the computer program.

Figure 3:
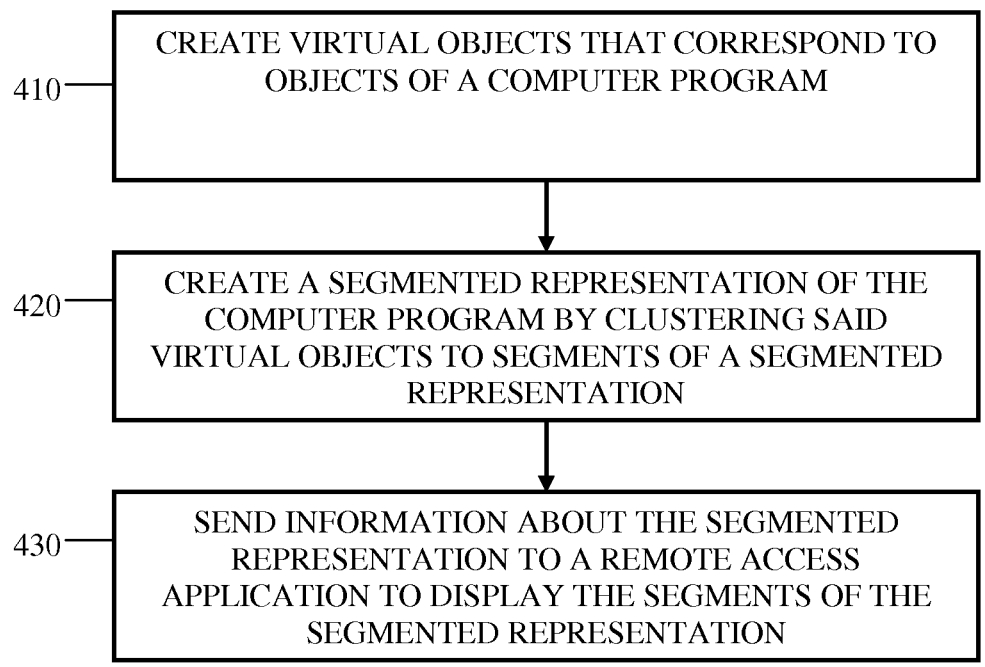
FIG. 3 is a flowchart illustrating a method for remote access to a computer program according to embodiments of the present invention.

Reference is now made to FIG. 3, which is a flowchart illustrating a method for remote access to a computer program according to embodiments of the present invention. As indicated in block 410, the method may include creating and/or displaying virtual objects that correspond to objects of a computer program, for example according to embodiments of the present invention as described herein. As indicated in block 420, the method may include creating a segmented representation of the computer program by clustering the virtual objects to segments of a segmented representation, for example according to embodiments of the present invention as described herein. As described above, segments may be created to fit size and/or shape of a device display. As indicated in block 430, the method may include sending information about the segmented representation to a remote access application to display the segments of the segmented representation, wherein each segment is controllable separately, for example according to embodiments of the present invention as described herein. Additionally as described herein, the virtual objects may be controllable separately. The segments of the segmented representation may be displayed separately in several pages, each page may comprise one or more segments. As described in detail above with reference to FIGS. 1 and 2, a method for remote access to a computer program according to embodiments of the present invention may include passing commands and/or information regarding an occurring event from objects of the computer program to the virtual objects and vice versa. Routing of the commands from virtual objects to the real objects of the computer program may be independent of the locations of the virtual objects in the segments of the segmented representation. Additionally, the method may include transmitting information for recreation of the segmented representation. Additionally, as described in detail above, the method for remote access to a computer program according to embodiments of the present invention may include generating a code to enable access to the computer program by the segmented representation, the generated code may be received by said remote access application to establish a connection with a respective segmented representation once the validity of the code is verified.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computerized system for remote access to a computer program, the system comprising:
    a computerized segmenting tool to create a segmented representation of a computer program by creating virtual objects that correspond to objects of said program and clustering said virtual objects to segments of the segmented representation; and
    a remote access application to receive information about the segmented representation from said segmenting tool and to display the segments of the segmented representation, wherein each segment is controllable separately.

2. The system according to claim 1, said computerized segmenting tool comprising an emulating module to create said segments and virtual objects and to pass changes from objects of the computer program to said virtual objects and vice versa.

3. The system according to claim 2, wherein emulating module is to create said segments to fit size and/or shape of a device display.

4. The system according to claim 2, wherein emulating module is to route commands from virtual objects to the real objects of the computer program independently of the locations of the virtual objects in the segments of the segmented representation.

5. The system according to claim 1, wherein said virtual objects are graphic representatives of corresponding objects in the computer program.

6. The system according to claim 1, wherein said virtual objects are controllable separately.

7. The system according to claim 1, wherein a segment of the segmented representation may be graphic representatives of a corresponding segment of the computer program.

8. The system according to claim 1, wherein each of said segments of the segmented representation is controllable as one piece.

9. The system according to claim 1, wherein the virtual objects and segments of the segmented representation can be arranged differently then in the original form of the computer program.

10. The system according to claim 1, wherein the virtual objects are movable within and between segments of the segmented representation.

11. The system according to claim 1, said computerized segmenting tool comprising a communication module to transmit information regarding an event occurring in a virtual object to a corresponding real object in the computer program and vice versa.

12. The system according to claim 1, said computerized segmenting tool comprising a database to store relation data between virtual objects and real objects of the computer program.

13. The system according to claim 1, said remote access application comprising a dynamic form module to receive from said computerized segmenting tool information needed in order to display the segmented representation and to coordinate events between real objects of the computer program and virtual objects.

14. The system according to claim 1, said remote access application comprising a dynamic form module to receive from said computerized segmenting tool information needed in order to create the segmented representation and to coordinate events between real objects of the computer program and virtual objects.

15. The system according to claim 11, wherein said dynamic form module is to recreate the segmented representation based on information received from said segmenting tool.

16. The system according to claim 11, wherein said dynamic form module is to display segments of the segmented representation separately in several pages, each page comprises one or more segments.

17. The system according to claim 1, wherein said segmenting tool is to generate a code to enable access to the original computer program and wherein said remote access application includes a code process module to receive the generated code and establish a connection with a respective original computer program and/or segmented representation once the validity of the code is verified.

18. A method for remote access to a computer program, the method comprising:
creating virtual objects that correspond to objects of a computer program;
creating a segmented representation of the computer program by clustering said virtual objects to segments of a segmented representation; and
sending information about the segmented representation to a remote access application to display the segments of the segmented representation, wherein each segment is controllable separately.

19. The method according to claim 17, comprising passing commands from objects of the computer program to said virtual objects and vice versa.

20. The method according to claim 17, wherein said segments are created to fit size and/or shape of a device display.

21. The method according to claim 17, comprising routing commands from virtual objects to the real objects of the computer program independently of the locations of the virtual objects in the segments of the segmented representation.

22. The method according to claim 17, wherein said virtual objects are controllable separately.

23. The method according to claim 17, comprising transmitting information regarding an event occurring in a virtual object to a corresponding real object in the computer program and vice versa.

24. The method according to claim 22, comprising transmitting information for recreation of the segmented representation.

25. The method according to claim 17, wherein said segments of the segmented representation are to be displayed separately in several pages, each page comprises one or more segments.

26. The method according to claim 17, comprising generating a code to enable access to the original computer program, the generated code is to be received by said remote access application to establish a connection with a respective original computer program once the validity of the code is verified.

* * * * *